United States Patent
Shih et al.

(10) Patent No.: US 10,157,190 B2
(45) Date of Patent: Dec. 18, 2018

(54) IMAGE ACTION BASED ON AUTOMATIC FEATURE EXTRACTION

(71) Applicant: Microsoft Technology Licensing, LLC., Redmond, WA (US)

(72) Inventors: Nai Wen Shih, Seattle, WA (US); Chia-Jiun Tan, Bellevue, WA (US); Carlos Perez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 15/083,120

(22) Filed: Mar. 28, 2016

(65) Prior Publication Data
US 2017/0277719 A1    Sep. 28, 2017

(51) Int. Cl.
| G06F 17/30 | (2006.01) |
| G06K 9/20 | (2006.01) |
| G06K 9/46 | (2006.01) |
| G06K 9/62 | (2006.01) |
| H04L 29/08 | (2006.01) |
| G06K 9/00 | (2006.01) |

(52) U.S. Cl.
CPC ... *G06F 17/30244* (2013.01); *G06K 9/00671* (2013.01); *G06K 9/2081* (2013.01); *G06K 9/46* (2013.01); *G06K 9/6267* (2013.01); *H04L 67/10* (2013.01)

(58) Field of Classification Search
CPC .......... G06F 17/30244; G06K 9/00671; G06K 9/46; G06K 9/2081; G06K 9/6267; H04L 67/10
USPC .......................................... 725/105
See application file for complete search history.

(56) References Cited

U.S. PATENT DOCUMENTS

| 8,630,494 B1 | 1/2014 | Svendsen |
| 8,983,150 B2 | 3/2015 | Dockhorn et al. |
| 9,058,611 B2* | 6/2015 | Saunders ............... G06Q 30/02 |
| 9,081,798 B1 | 7/2015 | Wong |
| 9,110,743 B2 | 8/2015 | Messerly et al. |
| 9,111,181 B2 | 8/2015 | Allen et al. |

(Continued)

FOREIGN PATENT DOCUMENTS

| EP | 1796019 A1 | 6/2007 |
| EP | 2400737 A2 | 12/2011 |
| WO | 2002008860 A2 | 1/2002 |

OTHER PUBLICATIONS

Miller, Matthew, "Never lose your smartphone photos, enable a free auto-upload service", Published on: Jan. 25, 2013 Available at: http://www.zdnet.com/article/never-lose-your-smartphone-photos-enable-a-free-auto-upload-service/.

(Continued)

*Primary Examiner* — Hung H Lam
(74) *Attorney, Agent, or Firm* — Michael Best & Friedrich LLP

(57) ABSTRACT

The present disclosure describes a system and method to automatically extract image features from an image uploaded to an image processing service executing on a cloud server from an image capture device, determine an image classification based at least in part on the image features, transmit a request to the image capture device for an image action based at least in part on the image classification, and execute the image action on the image based at least in part on receiving the image action from the image capture device in response to the request.

19 Claims, 13 Drawing Sheets

(56) References Cited

U.S. PATENT DOCUMENTS

| | | | |
|---|---|---|---|
| 9,779,294 B2* | 10/2017 | Zhang | G06K 9/00456 |
| 9,898,756 B2* | 2/2018 | Allan | G06Q 30/0255 |
| 2007/0046982 A1 | 3/2007 | Hull et al. | |
| 2011/0072047 A1* | 3/2011 | Wang | G06F 17/30265 |
| | | | 707/776 |
| 2011/0249144 A1* | 10/2011 | Chang | G06F 17/30259 |
| | | | 348/231.3 |
| 2012/0117051 A1* | 5/2012 | Liu | G06F 17/30967 |
| | | | 707/707 |
| 2012/0176509 A1 | 7/2012 | Aravamudan et al. | |
| 2014/0032666 A1 | 1/2014 | Chan et al. | |
| 2015/0055871 A1 | 2/2015 | Muthuswamy | |
| 2015/0081703 A1 | 3/2015 | Murphy-Chutorian et al. | |

OTHER PUBLICATIONS

Moynihan, Tim, "Google Photos Is Your New Essential Picture App", Published on: May 29, 2015 Available at: http://www.wired.com/2015/05/google-photos-new-essential-picture-app/.

Soferman, Nadav, "How to automatically tag and categorize photos according to their content", Published on: Jan. 5, 2015 Available at: http://cloudinary.com/blog/how_to_automatically_tag_and_categorize_photos_according_to_their_content.

Davis, et al., "From Context to Content: Leveraging Context to Infer Media Metadata", In Proceedings of the 12th annual ACM international conference on Multimedia, Oct. 10, 2004, 8 pages.

"International Search Report and Written Opinion Issued in PCT Application No. PCT/US2017/023494", dated Jul. 4, 2017, 11 Pages.

* cited by examiner

IMAGE ACTION BASED ON AUTOMATIC FEATURE EXTRACTION

TECHNICAL FIELD

The present disclosure relates to image capture and, more particularly, to image action based on automatic image feature extraction.

BACKGROUND

Mobile device use has become ubiquitous particularly for capturing images. Many use images to remember details of an event, a product, or the like. For example, a meeting attendee may take an image or photograph of meeting notes to enable later recollection of the meeting's discussion. For another example, a concert goer may capture an image or photograph of a concert ticket or poster to provide concert details for later retrieval. Timely image categorization has proven challenging particularly when the content of the images, rather than location is important. Manual image tagging often occurs temporally distant from the image's capture leading to sloppy or inaccurate tags. Existing image content analysis has proven largely insufficient to meet search and subsequent use requirements. A need remains, therefore, for image categorization improvements.

BRIEF DRAWINGS DESCRIPTION

The present disclosure describes various embodiments that may be understood and fully appreciated in conjunction with the following drawings:

FIGS. 1A-B schematically illustrate a block diagram of an exemplary system, in accordance with some embodiments;

FIG. 1C schematically illustrate a block diagram of an exemplary image capture device, in accordance with some embodiments;

FIG. 1D schematically illustrate a block diagram of an exemplary image processor, in accordance with some embodiments;

FIG. 2 illustrates a block diagram of an exemplary method, in accordance with some embodiments;

FIGS. 3A-I illustrate diagrams of an exemplary image capture device and system, in accordance with some embodiments;

DETAILED DESCRIPTION

Figure 1A:
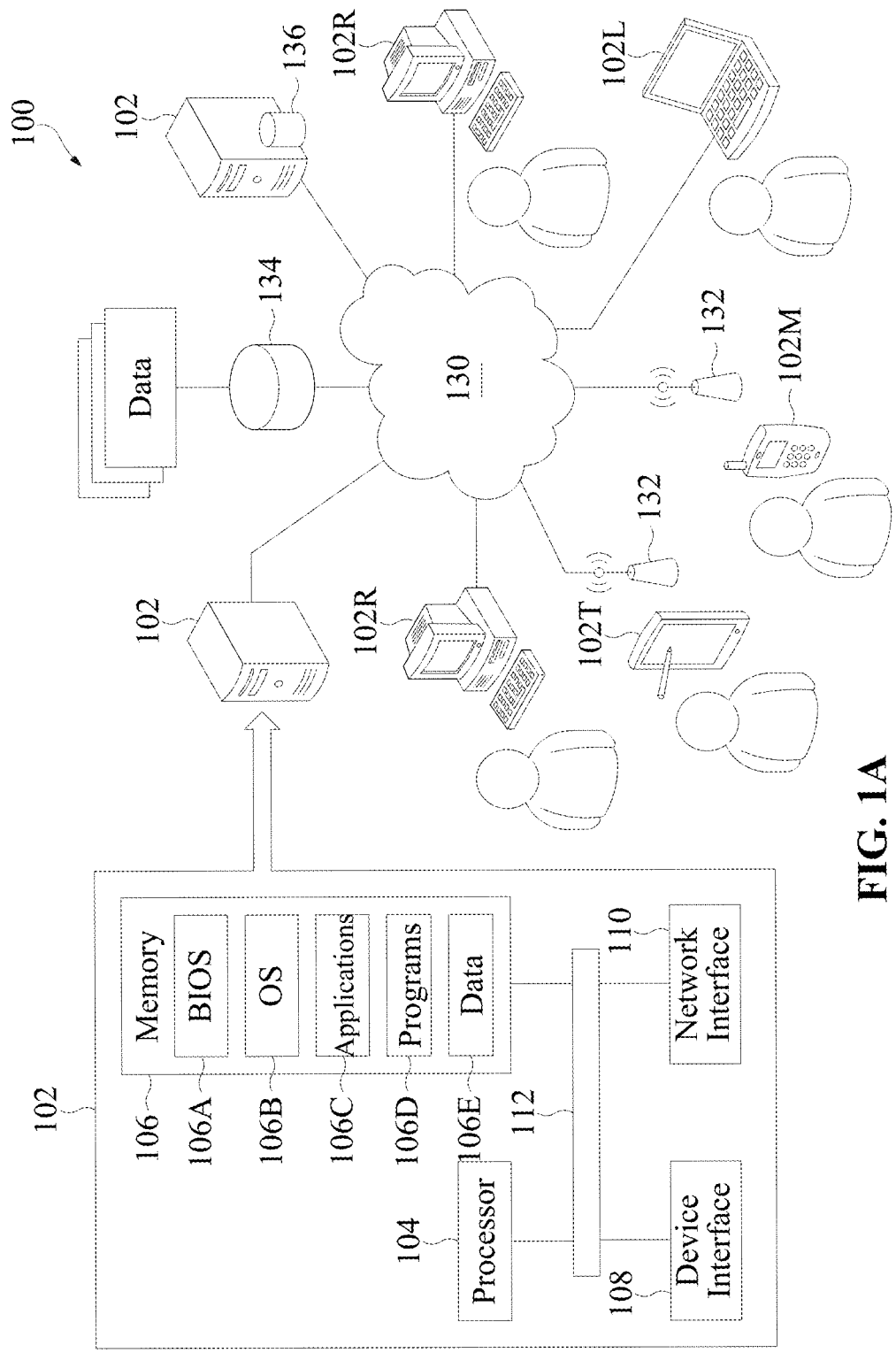

The present disclosure describes embodiments with reference to the drawing figures listed above. Persons of ordinary skill in the art will appreciate that the description and figures illustrate rather than limit the disclosure and that, in general, the figures are not drawn to scale for clarity of presentation. Such skilled persons will also realize that many more embodiments are possible by applying the inventive principles contained herein and that such embodiments fall within the scope of the disclosure which is not to be limited except by the claims.

Figure 1B:
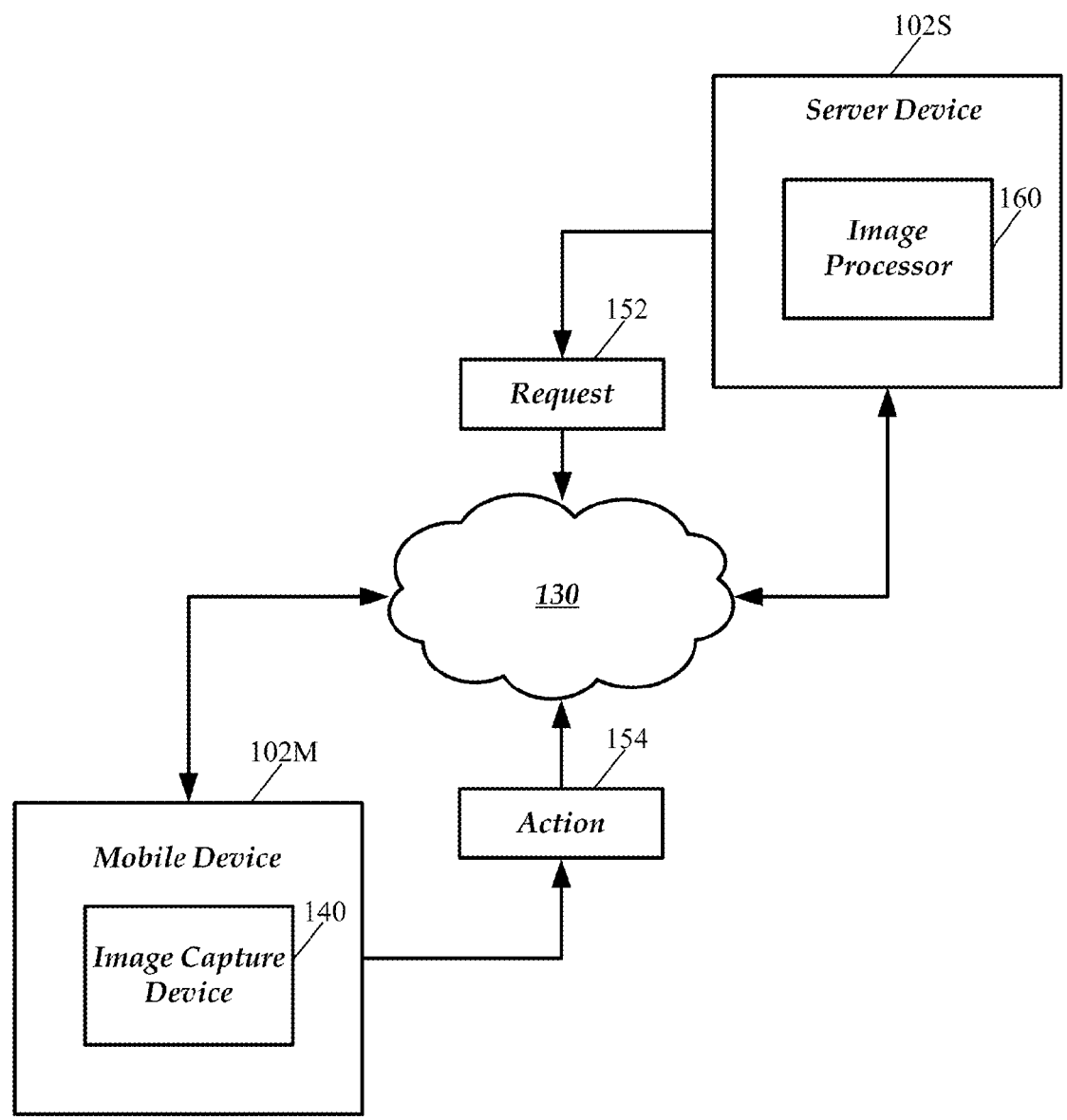

FIGS. 1A and 1B schematically illustrate a block diagram of an exemplary system 100, in accordance with some embodiments. Referring to FIGS. 1A and 1B, system 100 includes a computing device 102 that may execute instructions defining components, objects, routines, programs, instructions, data structures, virtual machines, and the like that perform particular tasks or functions or that implement particular data types. Instructions may be stored in any computer-readable storage medium known to a person of ordinary skill in the art, e.g., system memory 106, remote memory 134, or external memory 136. Some or all of the programs may be instantiated at run time by one or more processors comprised in a processing unit, e.g., processing device 104. A person of ordinary skill in the art will recognize that many of the concepts associated with the exemplary embodiment of system 100 may be implemented as computer instructions, firmware, hardware, or software in any of a variety of computing architectures, e.g., computing device 102, to achieve a same or equivalent result.

Moreover, a person of ordinary skill in the art will recognize that the exemplary embodiment of system 100 may be implemented on other types of computing architectures, e.g., general purpose or personal computers, hand-held devices, mobile communication devices, gaming devices, music devices, photographic devices, multi-processor systems, microprocessor-based or programmable consumer electronics, minicomputers, mainframe computers, application specific integrated circuits, and like. For illustrative purposes only, system 100 is shown in FIG. 1A to include computing devices 102, geographically remote computing devices 102R, tablet computing device 102T, mobile computing device 102M, and laptop computing device 102L. A person of ordinary skill in the art may recognize that computing device 102 may be embodied in any of tablet computing device 102T, mobile computing device 102M, or laptop computing device 102L. Mobile computing device 102M may include mobile cellular devices, mobile gaming devices, mobile reader devices, mobile photographic devices, and the like.

A person of ordinary skill in the art will recognize that an exemplary embodiment of system 100 may be implemented in a distributed computing system in which various computing entities or devices, often geographically remote from one another, e.g., computing device 102 and remote computing device 102R, perform particular tasks or execute particular objects, components, routines, programs, instructions, data structures, and the like. For example, the exemplary embodiment of system 100 may be implemented in a server/client configuration connected via network 130 (e.g., computing device 102 may operate as a server and remote computing device 102R or tablet computing device 102T may operate as a client, all connected through network 130). In distributed computing systems, application programs may be stored in and/or executed from local memory 106, external memory 136, or remote memory 134. Local memory 106, external memory 136, or remote memory 134 may be any kind of memory, volatile or non-volatile, removable or non-removable, known to a person of ordinary skill in the art including non-volatile memory, volatile memory, random access memory (RAM), flash memory, read only memory (ROM), ferroelectric RAM, magnetic storage devices, optical discs, or the like.

Computing device 102 may comprise processing device 104, memory 106, device interface 108, and network interface 110, which may all be interconnected through bus 112. The processing device 104 represents a single, central processing unit, or a plurality of processing units in a single or two or more computing devices 102, e.g., computing device 102 and remote computing device 102R. Local memory 106, as well as external memory 136 or remote memory 134, may be any type memory device known to a person of ordinary skill in the art including any combination of RAM, flash memory, ROM, ferroelectric RAM, magnetic storage devices, optical discs, and the like that is appropriate for the particular task. Local memory 106 may store a database, indexed or otherwise. Local memory 106 may store a basic input/output system (BIOS) 106A with routines executable by processing device 104 to transfer data, including data 106D, between the various elements of system 100. Local memory 106 also may store an operating system (OS) 106B executable by processing device 104 that, after being initially loaded by a boot program, manages other programs in the computing device 102. Memory 106 may store routines or programs executable by processing device 104, e.g., applications or programs 106C. Applications or programs 106C may make use of the OS 106B by making requests for services through a defined application program interface (API). Applications or programs 106C may be used to enable the generation or creation of any application program designed to perform a specific function directly for a user or, in some cases, for another application program. Examples of application programs include word processors, calendars, spreadsheets, database programs, browsers, development tools, drawing, paint, and image editing programs, communication programs, tailored applications, and the like. Users may interact directly with computing device 102 through a user interface such as a command language or a user interface displayed on a monitor (not shown). Local memory 106 may be comprised in a processing unit, e.g., processing device 104.

Device interface 108 may be any one of several types of interfaces. Device interface 108 may operatively couple any of a variety of devices, e.g., hard disk drive, optical disk drive, magnetic disk drive, or the like, to the bus 112. Device interface 108 may represent either one interface or various distinct interfaces, each specially constructed to support the particular device that it interfaces to the bus 112. Device interface 108 may additionally interface input or output devices utilized by a user to provide direction to the computing device 102 and to receive information from the computing device 102. These input or output devices may include voice recognition devices, gesture recognition devices, touch recognition devices, keyboards, monitors, mice, pointing devices, speakers, stylus, microphone, joystick, game pad, satellite dish, printer, scanner, camera, video equipment, modem, monitor, and the like (not shown). Device interface 108 may be a serial interface, parallel port, game port, firewire port, universal serial bus, or the like.

A person of ordinary skill in the art will recognize that the system 100 may use any type of computer readable medium accessible by a computer, such as magnetic cassettes, flash memory cards, compact discs (CDs), digital video disks (DVDs), cartridges, RAM, ROM, flash memory, magnetic disc drives, optical disc drives, and the like. A computer readable medium as described herein includes any manner of computer program product, computer storage, machine readable storage, or the like.

Network interface 110 operatively couples the computing device 102 to one or more remote computing devices 102R, tablet computing devices 102T, mobile computing devices 102M, and laptop computing devices 102L, on a local, wide, or global area network 130. Computing devices 102R may be geographically remote from computing device 102. Remote computing device 102R may have the structure of computing device 102 and may operate as server, client, router, switch, peer device, network node, or other networked device and typically includes some or all of the elements of computing device 102. Computing device 102 may connect to network 130 through a network interface or adapter included in the interface 110. Computing device 102 may connect to network 130 through a modem or other communications device included in the network interface 110. Computing device 102 alternatively may connect to network 130 using a wireless device 132. The modem or communications device may establish communications to remote computing devices 102R through global communications network 130. A person of ordinary skill in the art will recognize that programs 106C might be stored remotely through such networked connections. Network 130 may be local, wide, global, or otherwise and may include wired or wireless connections employing electrical, optical, electromagnetic, acoustic, or other carriers as is known to a person of ordinary skill in the art.

The present disclosure may describe some portions of the exemplary system 100 using algorithms and symbolic representations of operations on data bits within a memory, e.g., memory 106. A person of ordinary skill in the art will understand these algorithms and symbolic representations as most effectively conveying the substance of their work to others of ordinary skill in the art. An algorithm is a self-consistent sequence leading to a desired result. The sequence requires physical manipulations of physical quantities. Usually, but not necessarily, these quantities take the form of electrical or magnetic signals capable of being stored, transferred, combined, compared, and otherwise manipulated by physical devices, e.g., computing device 102. For simplicity, the present disclosure refers to these physical signals as bits, values, elements, symbols, characters, terms, numbers, or like. The terms are merely convenient labels. A person of ordinary skill in the art will recognize that terms such as computing, calculating, generating, loading, determining, displaying, or like refer to the actions and processes of a computing device, e.g., computing device 102. The computing device 102 may manipulate and transform data represented as physical electronic quantities within a memory into other data similarly represented as physical electronic quantities within the memory.

In an embodiment, system 100 may be a distributed network in which some computing devices 102 operate as servers, e.g., computing device 102, to provide content, services, or the like, through network 130 to other computing devices operating as clients, e.g., remote computing device 102R, laptop computing device 102L, tablet computing device 102T. In some circumstances, distributed networks use highly accurate traffic routing systems to route clients to their closest service nodes.

In an embodiment, system 100 may include server computing device 102S and mobile computing device 102M as shown in FIG. 1B. Server computing device 102S may include an image processor 160 to process images received from image capture device 140. Mobile computing device 102M may be geographically remote from server computing device 102S but connected to server computing device 102S through, e.g., network 130. Server computing device 102S may provide computing, content, services, or the like, through network 130 to mobile computing device 102M. In some instances, server computing device 102S may store, manage, and process data for mobile computing device 102M rather than mobile computing device 102M storing, managing, and processing data locally.

Mobile computing device 102M may further include an image capture device 140 that captures an image 145 (shown in FIG. 1C) of any object, person, animal, place, scene, or the like. Image capture device 140 may include a digital camera and attendant processing circuitry as explained in more detail below.

Figure 1C:
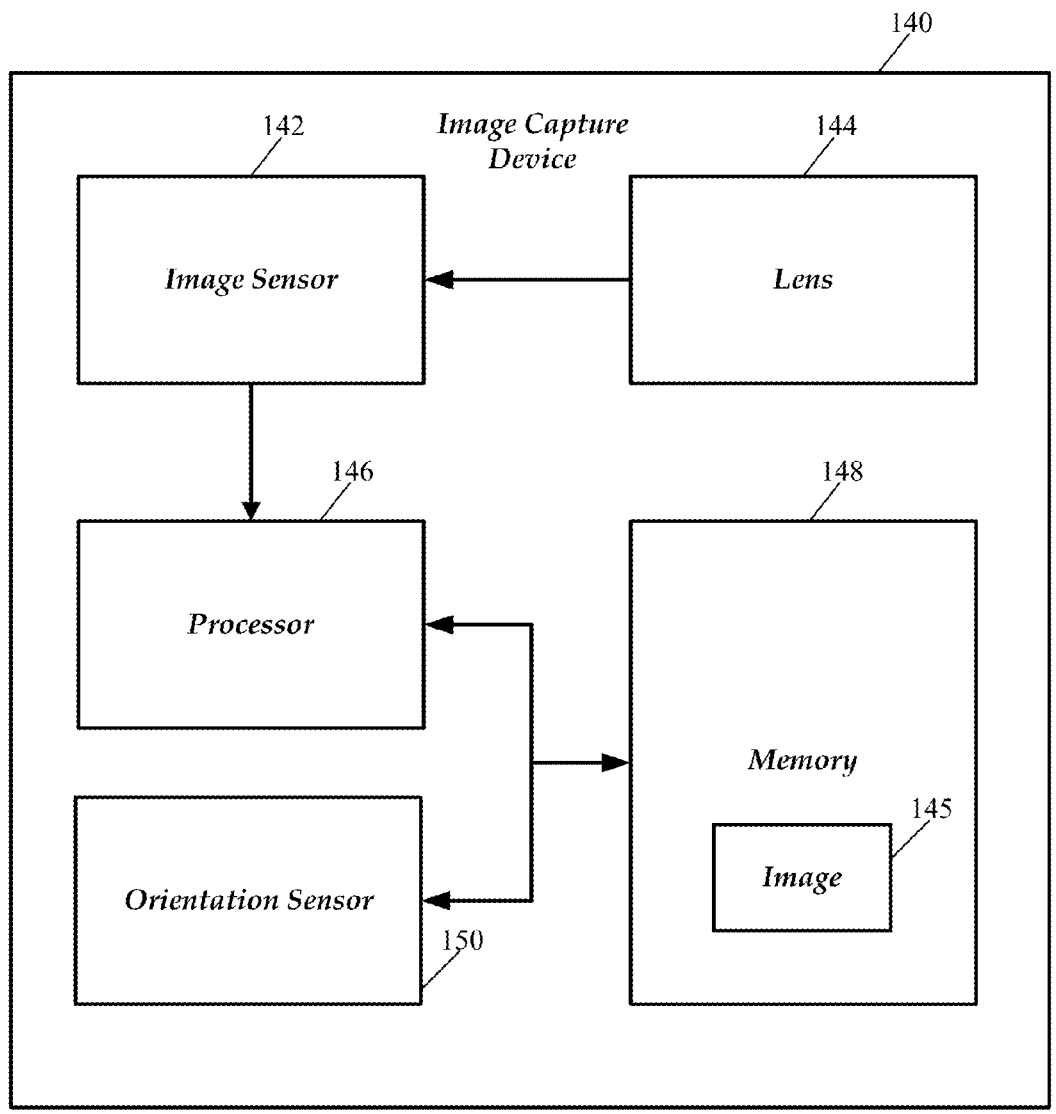

FIG. 1C schematically illustrates block diagram of an exemplary image capture device 140, in accordance with some embodiments. Referring to FIGS. 1A-1C, image capture device 140 may include an image sensor array 142, a lens 144, and processor 146. Lens 144 may focus light from a subject on image sensor array 142. Processor 146 may control lens 144 and image sensor array 142 as is well known to a person of ordinary skill in the art. Image sensor array 142 may capture image 145 as a plurality of pixel values in response to actuation of a shutter release, switch, or button (not shown) by a user. Image capture device 140 may further include a memory 148 to store image 145. Memory 148 may be local to mobile computing device 102M (like memory 106) or may be remote to mobile device 102M (like memory 134 or 136) but accessible to mobile computing device 102M. Memory 148 may include any type, size, or configuration of memory known to a person of ordinary skill in the art, e.g., removable memory, non-volatile memory, volatile memory, or the like. Memory 148 may include flash, dynamic random access (DRAM), static random access memory (SRAM), content addressable memory, read only memory (ROM), or the like.

Image capture device 140 may store image 145 as an object or file in memory 148, according to predefined and standardized formats, e.g., Joint Photographic Experts Group (JPEG), Graphics Interchange Exchange (GIF), raw, or the like. Within each file, image capture device 140 may arrange pixel values in a specific order, such as from left-to-right and from top-to-bottom. Mobile computing device 102M may display image 145 on a display based on the organization and pixel value order within the image object. An image object in accordance with a predefined format may contain pixel rows that extend horizontally relative to the orientation of image 145 when image 145 is eventually displayed on a display device (not shown) of mobile computing device 102M.

During or after capturing image 145, image capture device 140 may transfer the pixel values from sensor array 142 to memory 148 for processing and/or storage, permanent or otherwise. This processing may involve arranging or formatting the pixel values into image 145 that conforms to a predefined standard format, e.g., JPEG, GIF, or the like. Image capture device 140 may compress or format the pixel values from sensor array 142. Image capture device 140 may transfer the compressed or formatted pixel values as image 145 to removable memory 148 for storage therein. Processor 146 may access memory 148. In some embodiments, memory 148 may part of a removable storage device capable of being removed from image capture device 140 (or mobile computing device 102M) by a user and plugged into another computing device 102, e.g., remote computing device 102R, for further viewing or downloading of images stored thereon.

In an embodiment, image capture device 140 may include an orientation sensor 150 to indicate an orientation of the image sensor array 142 when an image is captured. Orientation sensor 150 may indicate whether the image capture device 140 (or mobile computing device 102M) is being held by a user in a landscape orientation or in a rotated, portrait orientation that is 90° from the landscape orientation. Orientation sensor 150 may enable processor 146 to automatically digital rotate captured images to correct for different orientations of image sensor 142.

Processor 146 may control the operation of lens 144, image sensor array 142, memory 148, orientation sensor 150, or any combination thereof. Processor 146 may be any processing device of any size or configuration known to a person of ordinary skill in the art.

Server computing device 102S may receive an image 145 from mobile computing device 102M through network 130. Server computing device 102S may include an image processor 160 to process image 145. Server computing device 102S may further include or have access to secondary applications or programs 170, e.g., calendar 170A, contacts 170B, social media 170C, or camera roll 170D. A person of ordinary skill in the art should recognize that one or more of secondary applications or programs 170 may be executing on computing devices other than server computing device 102S, e.g., computing device 102R, that may be coupled to server computing device 102 through known mechanisms, e.g., network 130.

Figure 1D:
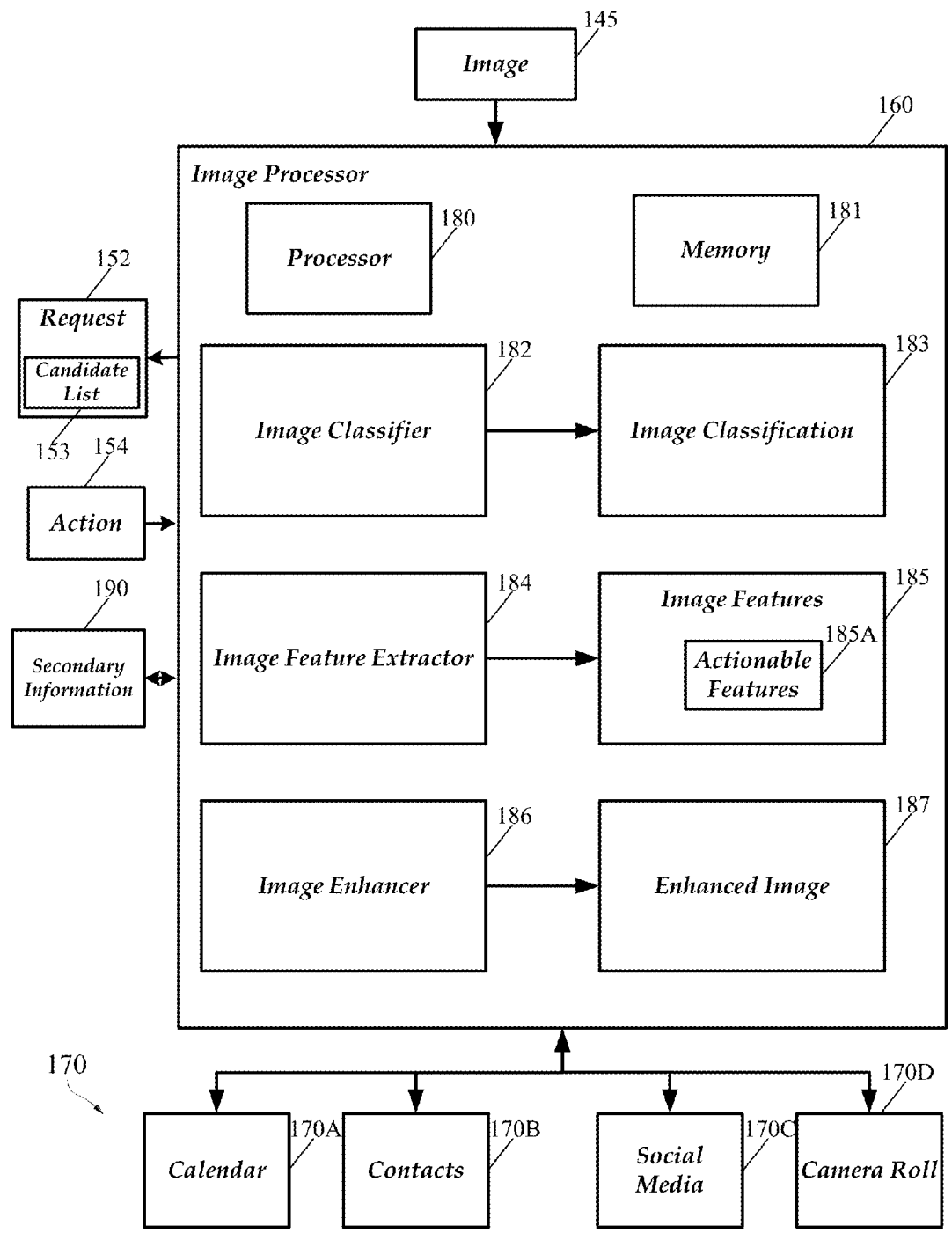

FIG. 1D schematically illustrates block diagram of an exemplary image processor 160, in accordance with some embodiments. Referring to FIGS. 1A-1D, image processor 160 may include a processor 180 and a memory 181 to store image 145 received from image capture device 140. Processor 180 may be any single processing device or multiple processing devices of any size or configuration known to a person of ordinary skill in the art. Like memory 148, memory 181 may be any type of memory in any configuration or size known to a person of ordinary skill in the art. Memory 181 may be local or remote from server computing device 102S. Image processor 160 may further include an image feature extractor 184, an image classifier 182, and an image enhancer 186. Processor 180 may control access to memory 181 and the operation of image classifier 182, image feature extractor 184, image enhancer 186, or a combination thereof.

Image feature extractor 184 may extract or otherwise determine features from image 145. In one embodiment, image feature extractor 184 may process image 145 using any known algorithms to automatically extract certain features, patterns, projections, components, or otherwise. Image feature extractor 184 may operate automatically, i.e., without need for user instruction or intervention. Image feature extractor 184 may process image 145 to extract image features 185, e.g., objects, characters, color, color saturation, color tint, color hue, color depth, contrast, gamma correction, histogram parameters, brightness, noise, facial recognition parameters, scene recognition parameters, object recognition parameters, text, or the like. Image feature extractor 184 may extract image features 185 using any algorithms, techniques, or practices known to a person of ordinary skill in the art, e.g., pixelation, linear or non-linear filtering, principal component analysis, digital signal processing, independent component analysis, Markov modeling, Fourier transforms, differential equations, vector modeling, and the like.

In an embodiment, image feature extractor 184 may identify actionable features 185A from image features 185 of image 145. Actionable features 185A may be a subset of image features 185 that may trigger image processor 160 to request further input from a user. For example, image feature extractor 184 may extract image features 185 that include a name, title, address, email address, or phone. Image feature extractor 184 may identify any one of the name, title, address, email address, or phone as actionable features 185A that trigger image processor 160 to transmit a request 152 for an action to computing device 102M, to which a user may reply with an action 154. Server computing device 102S may apply or execute the action on image 145, e.g., save or tag image 145 as a business card.

Image enhancer 186 may generate an enhanced image 187 by enhancing image 145. Image enhancer 186 may generate enhanced image 186A by enhancing or improving the quality of image 145 using any image enhancement mechanisms or algorithms known to a person of ordinary skill in the art, e.g., image pixel manipulation, filtering, interpolation, and the like. In some embodiments, image enhancer 186 may enhance image 145 based on extracted features 185. For example, image enhancer 186 may darken or lighten image 145 based on extracted features 185, e.g., an image histogram, indicative of an image that is lighter or darker than predetermined image quality standards.

Image classifier 182 may determine image classification 183 based on image features 185 and/or actionable features 185A. Image classifier 182 may classify image 145 in any number of known classifications 183, e.g., whiteboard, business card, event ticket, receipt, scene, photograph, meeting notes, document, calendar entry, or the like.

For example, image classifier 182 may classify image 145 as a whiteboard based on image feature extractor 184 extracting or detecting a text image feature 185 on a predominantly white background image feature 185. For another example, image classifier 182 may classify image 145 as a group photograph based on image feature extractor 184 extracting facial features 185 from image 145.

Figure 4:
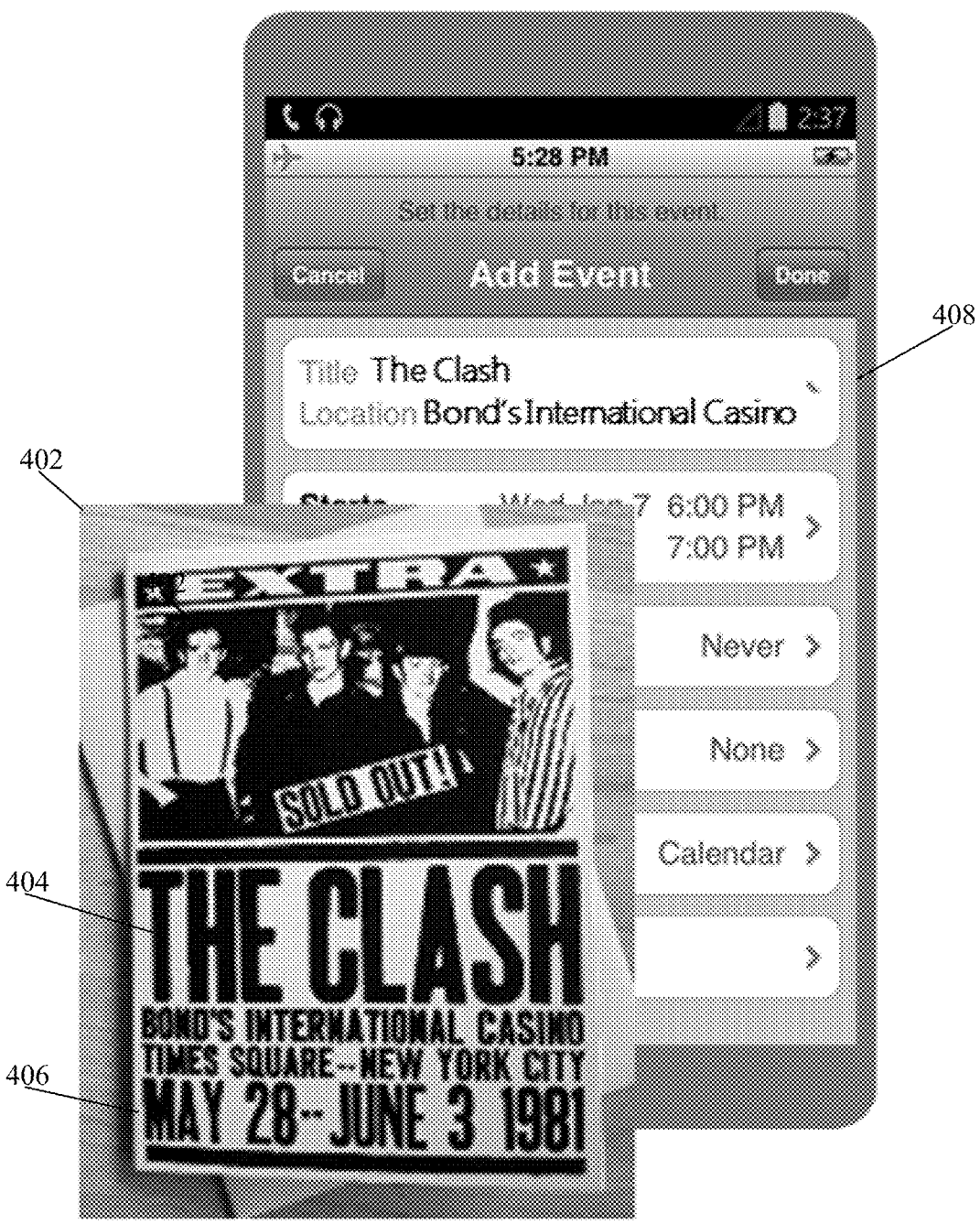
FIG. 4 illustrates a diagram of an exemplary system for creating an event, in accordance with some embodiments.

For yet another example shown in FIG. 4, image classifier 182 may classify image 145 as a ticket 402 to an event based on image feature extractor 184 extracting one or more of predetermined types of text features 185, e.g., band name, date, venue, or the like.

Figure 5:
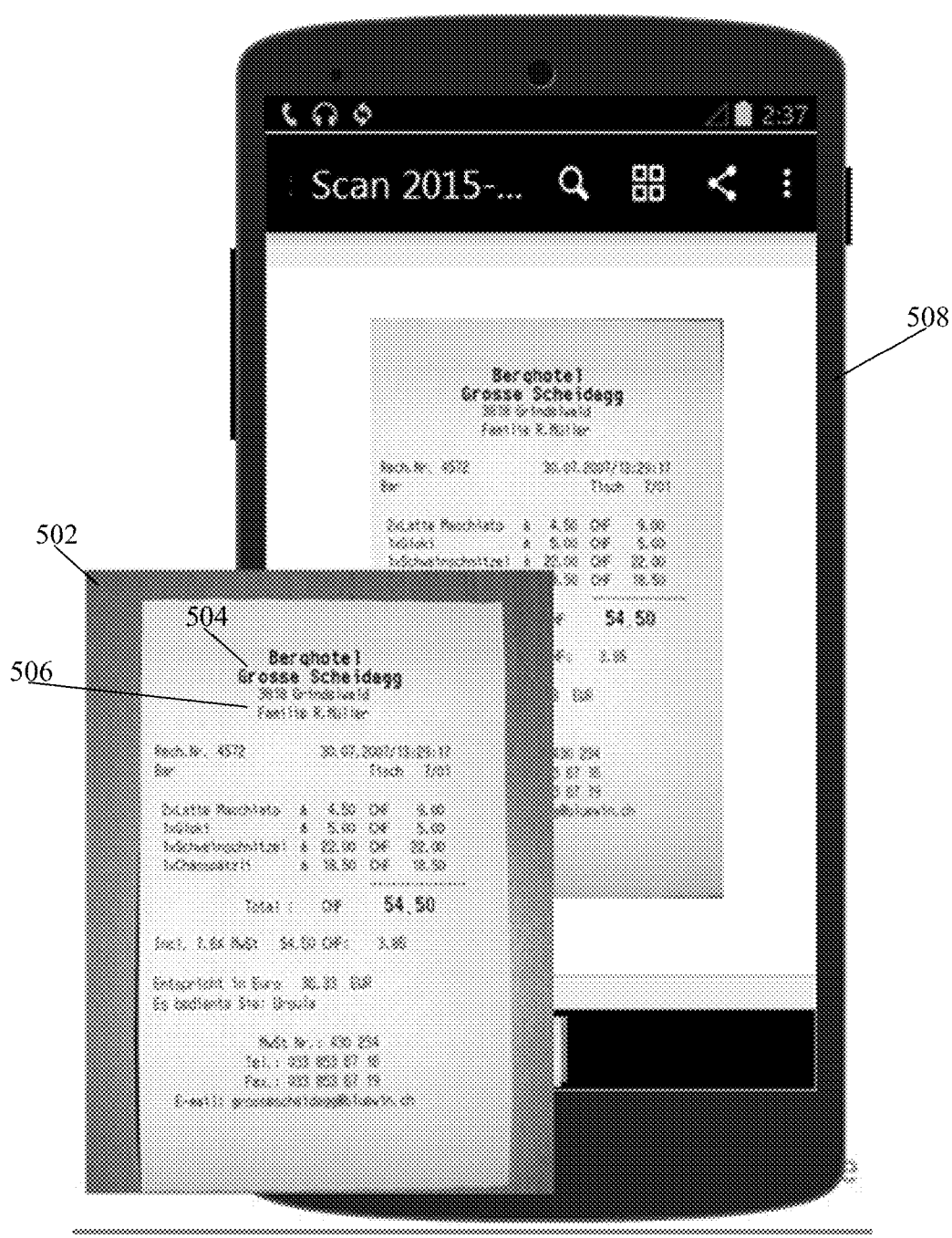
FIG. 5 illustrates a diagram of an exemplary system for exporting an image, in accordance with some embodiments.

For yet another example shown in FIG. 5, image classifier 182 may classify image 145 as a receipt 502 based on image feature extractor 184 extracting one or more of predetermined types of text features 185, e.g., date, currency amount, food or beverage identifiers, establishment name, or the like.

Figure 6:
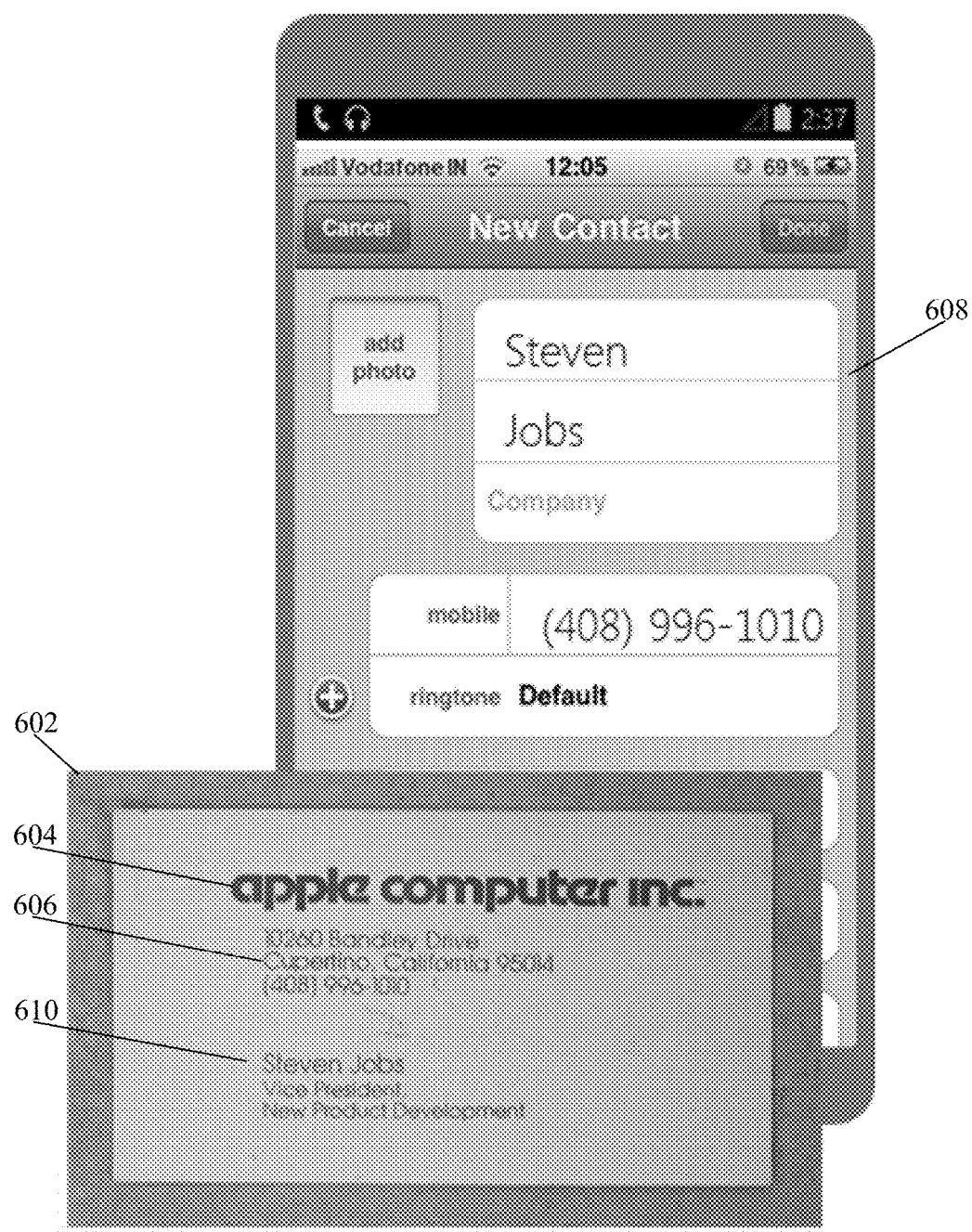
FIG. 6 illustrates a diagram of an exemplary system for creating a contact, in accordance with some embodiments.

For yet another example shown in FIG. 6, image classifier 182 may classify image 145 as a business card 602 based on image feature extractor 184 extracting one or more of predetermined types of text image features 185, e.g., name, title, company name, street address, email address, phone number, fax number, or the like.

In some embodiments, image classifier 182 may determine image classification 183 on image features 185, actionable features 185A, and/or secondary information 190 determined from secondary sources (not shown). Image classifier 182 may have access to a search engine or database (not shown) executing on a computing device 102 from which it may associate a particular text feature 185 extracted from image 145 to a particular object, person, entity, location, type, or the like. For example, image classifier 182 may determine that extracted text features 185 include a band name 404 (FIG. 4) and a date 406 (FIG. 4) from which it may determine that the subject of image 145 is of an event ticket 402. For another example, image classifier 182 may determine that extracted text features 185 may identify a restaurant 504 (FIG. 5) or bar and/or address 506 (FIG. 5) from which it may determine that image 145 is of a receipt for a drink or meal at the restaurant or bar 504. For yet another example, image classifier 182 may determine that extracted text features 185 may identify an entity 604 (FIG. 6) and/or address 606 (FIG. 6) from which it may determine that image 145 is of a business card.

In some embodiments, image processor 160 may provide a user an option to save the image to a work account, a personal account, or any other category of account. These account may be set up as options by a user as predetermined preferences at installation or otherwise. For example, in a circumstance in which image classifier 182 classifies an image as a receipt 502, image processor 160 may automatically offer the user an option to save the receipt 502 to a work account so as to enable the separation of personal and work expenses and the eventual production of expense reports. In some embodiments, it may be helpful to query the user as to their choice of accounts to store the image.

In some embodiments, image processor 160 may obtain secondary information 190 from applications 106C or executable programs 106D executing on computing devices 102 on system 100 via network 130. In other embodiments, image processor 160 may obtain secondary information 190 from other executable applications 106C or executable programs 106D executing on server computing device 102S.

Image processor 160 may seek secondary information 190 from applications or programs 170, e.g., calendar 170A, contacts 170B, social media 170C, camera roll 170C, or the like. Calendar 170A may be any known application or program that records appointments or meetings, lists directions to meeting locations, tracks meeting attendees, transmits appointment or meeting requests to others, or the like.

Contacts 170B may be any known application or program that records contact information for people, institutions, businesses, government agencies, universities, or the like. Contact information may include name, address, phone number, email address, website address, photograph, directions, or the like.

Social media 170C may be any known application or program that enables users to create and share content or to participate in social networking.

Camera roll 170D may be any known application or program that enables storing of images and attendant metadata. Camera roll 170D may have ability to group or categorize storage of photos into different containers or directories by e.g., date it was taken, location, tags, or the like.

In an embodiment, image processor 160 may extract a universal reference locator (URL) from the image that it may make navigable by simply clicking or otherwise selecting the URL. In some embodiments, the URL may be part of the image's metadata.

In an embodiment, image processor 160 may transmit request 152 for an action to computing device 102M based in image classification 183, image features 185, or actionable features 185A, or a combination thereof. Mobile computing device 102M may reply to request 152 with an action 154.

Request 152 may include a list of candidate actions 153 based on image classification 183, image features 185, actionable features 185A, or a combination thereof. Candidate actions 153 may be based on classification 183, e.g., image processor 160 may classify an image 145 as a business card 602 (FIG. 6) that, in turn, may result in specific candidate actions 153, e.g., turning the extracted features 185 of the image 145, e.g., name, title, company, address, and the like into corresponding fields in a contact 608 to be created in contacts 170B.

For another example, image processor 160 may classify an image 145 as a group photo that, in turn, may result in specific candidate actions 153, e.g., identifying or tagging the individuals in the group photo from information gleaned from social media 170C or contacts 170B and transmitting a copy of the group photo to those individuals.

For yet another example, image processor 160 may classify an image 145 as a whiteboard after discerning text on a substantially white background as image features 185 that, in turn, may result in specific candidate actions 153, e.g., sending the whiteboard image 145 to other attendees of the meeting during which the whiteboard that is the subject of image 145 was created. By doing so, image processor 160 may specifically tailor request 152 to list candidate actions 153 associated with classification 183, image features 185, secondary information 190, or a combination thereof. Thus, for each classification 183 of image 145, image processor 160 may have an associated predetermined list of candidate actions 153 from which an action 154 may be selected by a user. Action 154 may then be transmitted back from mobile device 102M to server computing device 102S.

Figure 2:
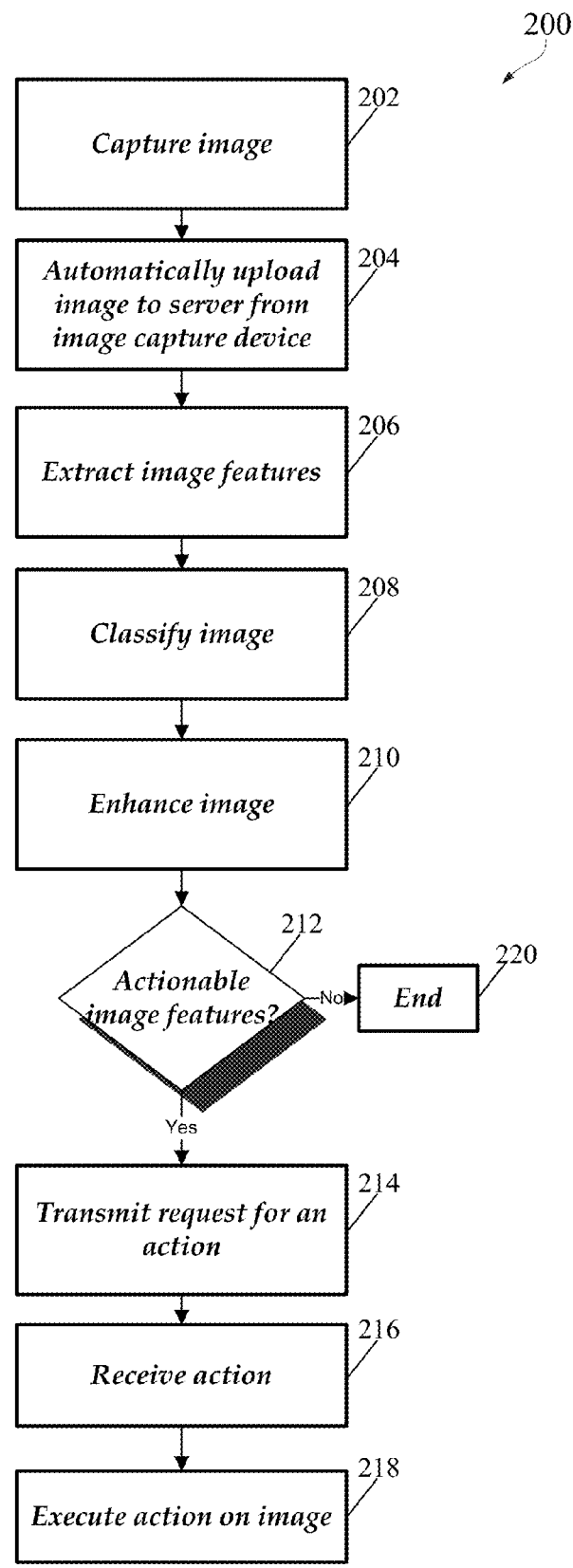

FIG. 2 illustrates a block diagram of an exemplary method 200, in accordance with some embodiments. At 202, method 200 captures an image with an image capture device. Method 200 may focus light on an image sensor array in image capture device to capture a subject in response to activation of a shutter release, switch, or button. Once captured, method 200 may store the captured image in temporary or permanent memory in image capture device.

At 204, method 200 automatically uploads the image from the image capture device to an image processor program or application executing on a server without any intervention from a user. Method 200 may transmit the image from the image capture device to the image processor application or program executing on the server without necessitating further or separate instruction or action from a user to do so, other than activation of a shutter release, switch, or button. Method 200 may transmit the image from the image capture device to the image processor application or program using any means known to a person of ordinary skill in the art.

At 206, method 200 may extract image features from the image at the image processor program or application executing on the server. Method 200 may automatically extract image features from the image without any intervention from a user using any means known to a person of ordinary skill in the art. Method 200 may automatically extract image features from the image based on predetermined settings reflecting user or default preferences, e.g., extracting all image features or a portion of the image settings or extracting image features above or below particular thresholds. Method 200 may identify at least a portion of the extracted image features as actionable image features that may trigger further action on the image. Method 200 may extract any known image features, e.g., objects, characters, color, color saturation, color tint, color hue, color depth, contrast, gamma correction, histogram parameters, brightness, noise, facial recognition parameters, scene recognition parameters, object recognition parameters, text, or the like.

At 208, method 200 may classify the image based on the extracted image features. Method 200 may classify the image in any known image classifications, e.g., whiteboard, business card, event ticket, receipt, scene, photograph, meeting notes, document, calendar entry, or the like.

At 210, method 200 may classify enhance the image 210 based on the image features, image classification, or a combination thereof. Method 200 may enhance the image using any algorithms or processes known to a person of ordinary skill in the art.

At 212, method 200 may determine whether there are any actionable image features in the image. If no actionable features exist, method 200 may end at 220.

If actionable features exist, at 214, method 200 may transmit a request that includes a candidate list of actions associated with the image to the image capture device. In an embodiment, the candidate list of action may be associated with the image classification or with the extracted features in the image.

At 216, method 200 may receive an action to be executed on the image. The action may be chosen by the user from the list of candidate actions.

At 218, method 200 may execute the action on or associated with the image. For example, method 200 may receive at 216 an action that indicates that the user desires to save the business card 602 as a contact and thus, at 218, method 200 may create contact 608 with the image features extracted from business card 602.

Figure 3A:
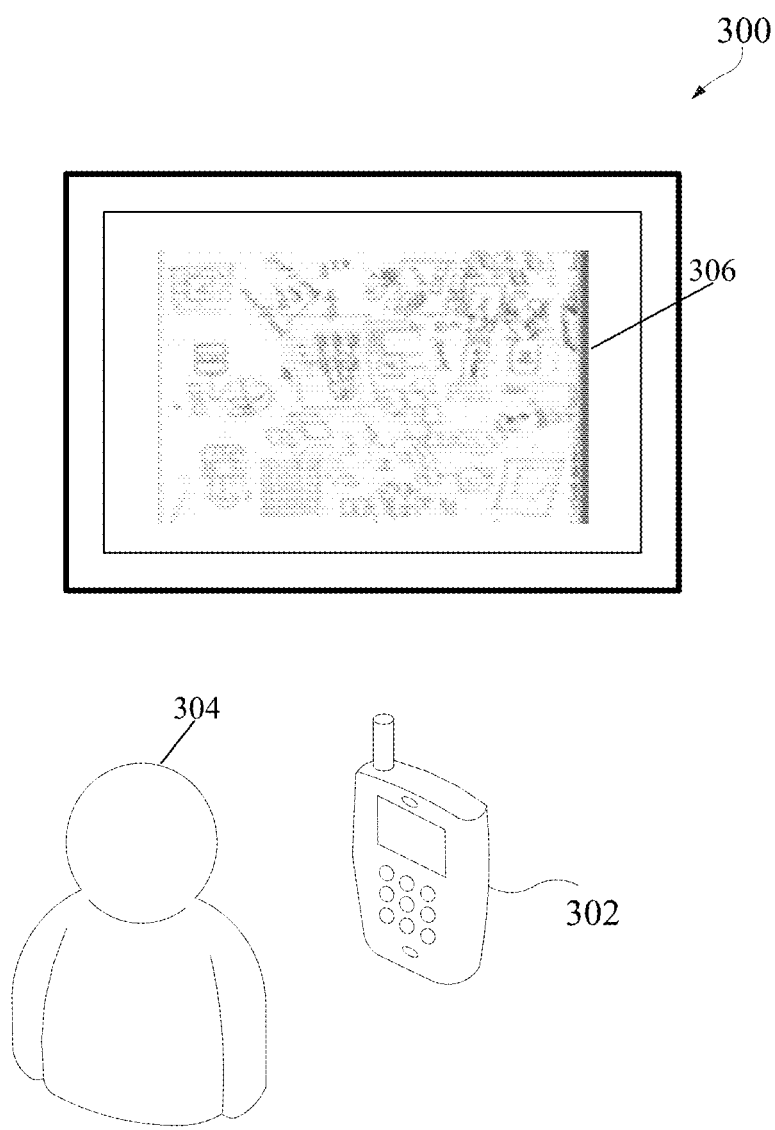
Figure 3B:
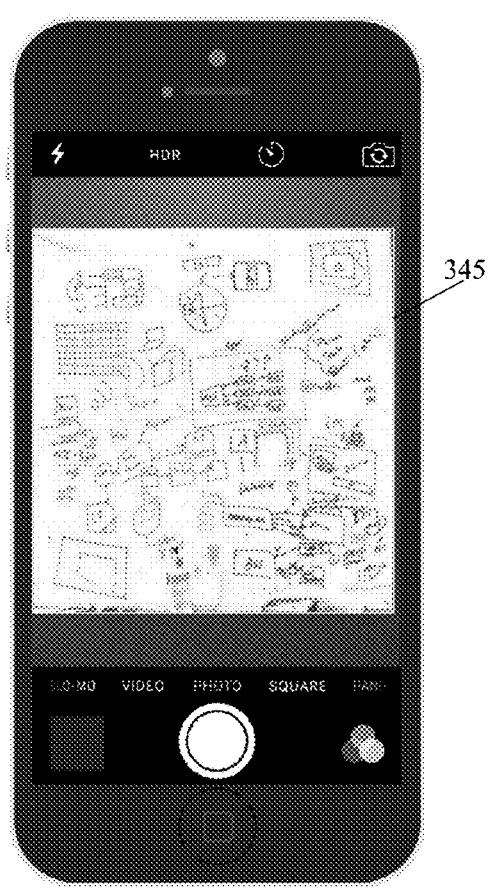
Figure 3C:
Figure 3D:
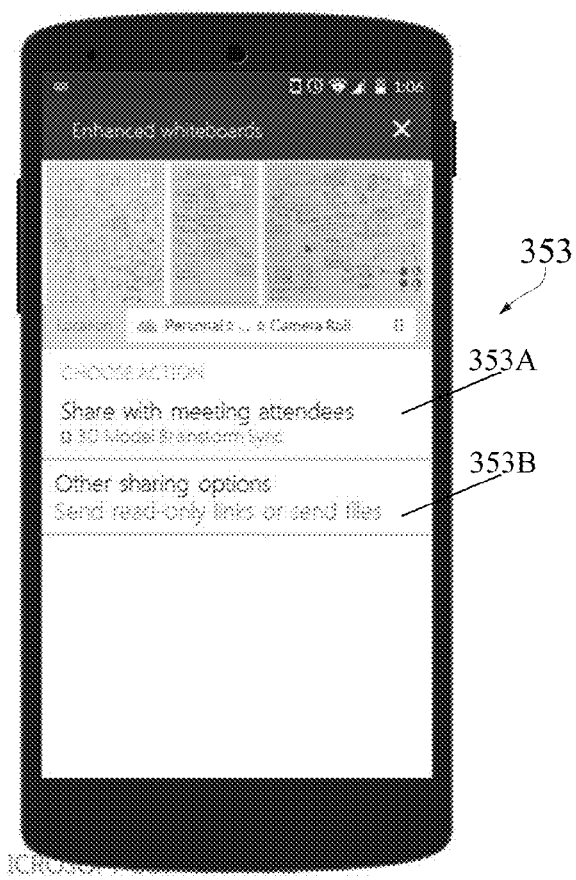
Figure 3E:
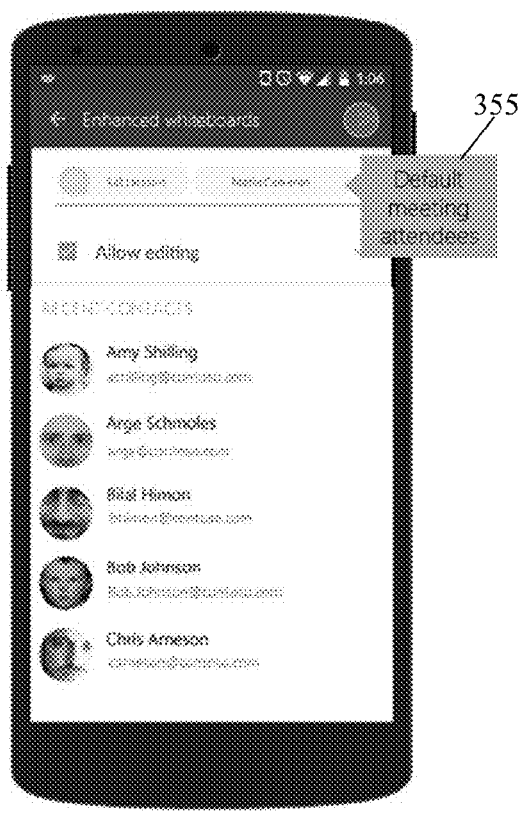
Figure 3F:
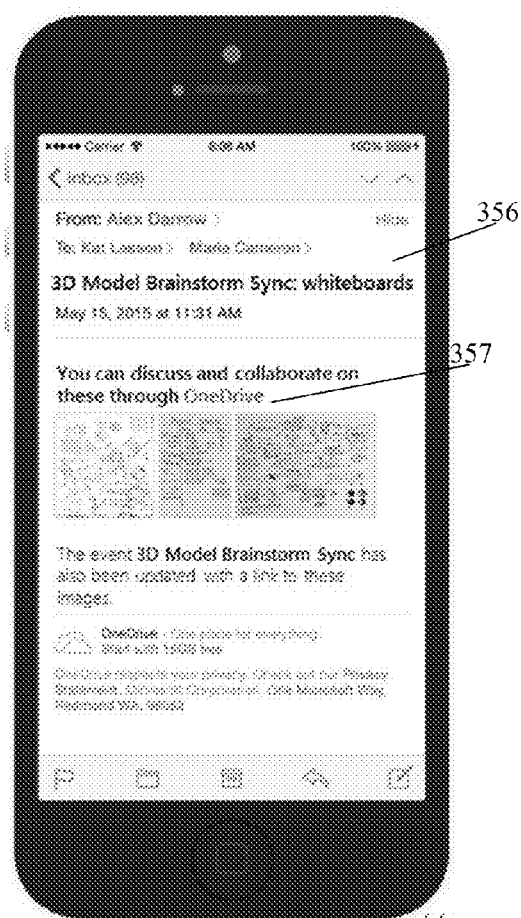
Figure 3G:
Figures 3H, 3I:

FIGS. 3A-I illustrate diagrams of an exemplary image capture device and system, in accordance with some embodiments. Referring to FIGS. 1A-D and 3A-L, a user 302 may capture an image 345 of a whiteboard 306 using an image capture device 302 that may include any of computing devices 102, 102M, 102S, 102L, 102R, or 102T. Image capture device 302 automatically uploads image 345 to an image processor 360 executing on a server via network 130. Image processor 360 may automatically upload image 345 without any intervention or specific instruction to do so from user 304. Image processor 360 may extract image features from image 345, classify image 345, and enhance image 345 as described above. Image processor 360 may determine a candidate list of actions 353 associated with the image 345. Image capture device 302 may display the candidate list of actions 353 to user 304. The candidate list of actions 353 may be based on the image classification 183, image features 185, actionable features 185A, secondary information 190, or a combination thereof. In an embodiment, user 304 may choose to share image 345 with meeting attendees 355 at 353A. Alternatively, user 304 may opt to see other available sharing options at 353B, e.g., sending an email 356 with a link 357 to a location on system 100 storing image 345 (FIG. 3F) or displaying social media or other applications 359 from which to share the link (FIG. 3G). Image capture device 302 may display to user 304 that image 345 is stored in recent images category 358 of camera roll 170D (FIG. 3H) and/or automatically tagged with tag 361 (FIG. 3I).

FIG. 4 illustrates a diagram of an exemplary system for creating an event, in accordance with some embodiments. Referring to FIGS. 1A-D and 4, image processor 160 may determine from extracting band name 404 and date 406 that image 145 is of a band ticket or poster 402. Image processor 160 may transmit request 152 to mobile computing device 102M requesting action 154 to be performed on or in association with ticket or poster 402. Image processor 160 may receive action 154 indicating a desire for image processor 160 to create an event 408 from the extracted band name 404 and date 406 of image 145.

FIG. 5 illustrates a diagram of an exemplary system for exporting an image, in accordance with some embodiments. Referring to FIGS. 1A-D and 5, image processor 160 may determine from extracting a restaurant name 504 and an address 506 that image 145 is of a receipt 502. Image processor 160 may transmit a request 152 to mobile computing device 102M requesting action 154 to be performed on or in association with receipt 502. Image processor 160 may receive action 154 indicating a desire for image processor 160 to create a scan 508 of receipt 502 for exporting to an application or program in a predetermined format, e.g., portable document format, for submission for reimbursement.

FIG. 6 illustrates a diagram of an exemplary system for creating a contact, in accordance with some embodiments. Referring to FIGS. 1A-D and 6, image processor 160 may determine from extracting a company name 604, a company address 606, and a name 610 that image 145 is of a business card 602. Image processor 160 may transmit a request 152 to mobile computing device 102M requesting action 154 to be performed on or in association with business card 602. Image processor 160 may receive action 154 indicating a desire for image processor 160 to create a contact 608.

It will also be appreciated by persons of ordinary skill in the art that the present disclosure is not limited to what has been particularly shown and described hereinabove. Rather, the scope of the present disclosure includes both combinations and sub-combinations of the various features described hereinabove as well as modifications and variations which would occur to such skilled persons upon reading the foregoing description. Thus the disclosure is limited only by the appended claims.

The invention claimed is:

1. A system, comprising:
a memory configured to store instructions; and
one or more processors configured to execute the instructions stored in the memory to:
automatically extract image features from an image uploaded to an image processing service executing on the one or more processors from an image capture device;
determine an image type classification based at least in part on the image features;
transmit a request to the image capture device for user selection of an image action based at least in part on the image type classification;
receive the user selection of the image action from the image capture device; and
in response to the user selection, execute the image action on the image, the image action including at least one selected from a group consisting of sharing the image, storing the image, emailing the image, turning extracted features of the image into corresponding fields of a contact data structure, sending the image to other attendees of a meeting where the image was acquired, identifying individuals in the image, and sending a copy of the image to at least one individual identified in the image.

2. The system of claim 1, wherein the one or more processors are configured to execute the instructions stored in the memory further to:
automatically receive the image at the image processing service from the image capture device by establishing a connection between the image processing service and the image capture device in response to the image capture device detecting capture of the image.

3. The system of claim 2, wherein the one or more processors are configured to execute the instructions stored in the memory further to:
automatically receive the image from the image capture device in response to the image capture device detecting a shutter release.

4. The system of claim 1, wherein the one or more processors are configured to execute the instructions stored in the memory further to:
automatically store the image in a data store.

5. The system of claim 1, wherein the image features comprise color, color saturation, color tint, color hue, color depth, contrast, gamma correction, histogram parameters, brightness, noise, facial recognition parameters, scene recognition parameters, or object recognition parameters.

6. The system of claim 1, wherein the one or more processors are configured to execute the instructions stored in the memory further to:
automatically enhance the image based at least in part on the image type classification or the image features.

7. The system of claim 1, wherein the one or more processors are configured to execute the instructions stored in the memory further to:
determine metadata corresponding to the image; and
store the image together with the metadata.

8. The system of claim 7, wherein the one or more processors are configured to execute the instructions stored in the memory further to:
access secondary information about the image; and
transmit the request to the image capture device for the image action based at least in part on the secondary information.

9. A method, comprising:
receiving, at an image processor executing on a cloud server, an image automatically uploaded from an image capture device;
automatically identifying at least one image feature from the image;
determining an image type classification based at least in part on the at least one image feature;
transmitting a request to the image capture device for user selection of an action based at least in part on the image type classification;
receiving the user selection of the action from the image capture device; and
in response to receiving the user selection, executing the action on the image, the action including at least one selected from a group consisting of sharing the image, storing the image, emailing the image, turning extracted features of the image into corresponding fields of a contact data structure, sending the image to other attendees of a meeting where the image was acquired, identifying individuals in the image, and sending a copy of the image to at least one individual identified in the image.

10. The method of claim 9, further comprising:
automatically establishing a communication connection between the image processor and the image capture device in response to the image capture device detecting capture of the image.

11. The method of claim 10, further comprising:
automatically receiving the image from the image capture device via the communication connection in response to the image capture device detecting a shutter release.

12. The method of claim 9, wherein the at least one image feature comprises color, color saturation, color tint, color hue, color depth, contrast, gamma correction, histogram parameters, brightness, noise, facial recognition parameter, scene recognition parameter, or object recognition parameter.

13. The method of claim 9, further comprising:
automatically enhancing the image based at least in part on the image type classification or the at least one image feature.

14. The method of claim 9, further comprising:
determining metadata corresponding to the image; and
storing the image together with the metadata.

15. The method of claim 9, further comprising:
accessing secondary information about the image; and transmitting the request to the image capture device for the image action based at least in part on the secondary information.

16. A non-transitory computer-readable storage medium comprising instructions that, when executed by one or more processing devices, cause the one or more processing devices to:
   automatically extract image features from an image automatically uploaded to an image processing service executing on a cloud server from an image capture device;
   determine an image type classification based at least in part on the image features;
   access secondary information about the image from a secondary application;
   transmit a request to the image capture device for user selection of an action to be applied to the image based at least in part on the image type classification or the secondary information;
   receive the user selection of the action to be applied to the image from the image capture device; and
   in response to receiving the user selection, apply the action to the image, the action including at least one selected from a group consisting of sharing the image, storing the image, emailing the image, turning extracted features of the image into corresponding fields of a contact data structure, sending the image to other attendees of a meeting where the image was acquired, identifying individuals in the image, and sending a copy of the image to at least one individual identified in the image.

17. The non-transitory computer-readable storage medium of claim 16, wherein execution of the instructions by the one or more processing devices, cause the one or more processing devices further to:
   automatically enhance the image based at least in part on the image type classification or the image features.

18. The non-transitory computer-readable storage medium of claim 16, wherein execution of the instructions by the one or more processing devices, cause the one or more processing devices further to:
   determine metadata corresponding to the image; and
   store the image together with the metadata.

19. The system of claim 1, wherein the image type classification is at least one selected from a group consisting of whiteboard, business card, event ticket, receipt, scene, photograph, meeting note, calendar entry, document, and group photo.

* * * * *